United States Patent

Krenceski et al.

Patent Number: 5,741,836
Date of Patent: Apr. 21, 1998

[54] SCREEN-PRINTABLE INK-RECEPTIVE COMPOSITIONS

[75] Inventors: Mary A. Krenceski, Delmar; Kevin J. Swallow, Avon; Douglas Eugene Bugner; Alfred John Amell, both of Rochester, all of N.Y.

[73] Assignee: Eastman Kodak Company, Rochester, N.Y.

[21] Appl. No.: 362,364

[22] Filed: Dec. 22, 1994

[51] Int. Cl.[6] .............. C08L 1/26; C09D 11/00; C09D 11/14

[52] U.S. Cl. .............. 524/44; 524/43; 524/45; 524/500; 524/503; 106/22 H; 106/26 R

[58] Field of Search .............. 524/44, 500, 503, 524/55, 56, 47, 43–45; 428/327, 195, 206, 328, 329, 330, 331, 336, 480, 483, 500, 520; 106/22 F, 23 F, 24 B, 20 D, 19 C, 37

[56] References Cited

U.S. PATENT DOCUMENTS

| | | |
|---|---|---|
| 4,585,815 | 4/1986 | Ono et al. .............. 524/23 |
| 4,657,590 | 4/1987 | Gamblin .............. 106/22 |
| 4,903,040 | 2/1990 | Light .............. 346/1.1 |
| 4,903,041 | 2/1990 | Light .............. 346/1.1 |
| 5,084,338 | 1/1992 | Light .............. 428/337 |
| 5,084,340 | 1/1992 | Light .............. 328/327 |
| 5,126,193 | 6/1992 | Light .............. 428/327 |
| 5,126,194 | 6/1992 | Light .............. 428/327 |
| 5,126,195 | 6/1992 | Light .............. 428/327 |
| 5,139,867 | 8/1992 | Light .............. 428/327 |
| 5,147,717 | 9/1992 | Light .............. 428/327 |

*Primary Examiner*—Paul R. Michl
*Assistant Examiner*—Olga Asinovsky
*Attorney, Agent, or Firm*—John R. Everett

[57] ABSTRACT

This invention is a screen-printable ink receptive composition. It contains (a) a hydrophilic polymer and (b) a thickener and has (c) a viscosity of 10 to 1,000 poise at shear rates less than $10^0$ s$^{-1}$ and exhibits (d) a shear thinning behavior defined by the following relationship:

$$\log(\text{viscosity}) = A [\log(\text{shear rate})]$$

wherein A represents (e) the slope of the line obtained by plotting log(viscosity) against log(shear rate) and has (f) a value of up to −0.1 when calculated over shear rates ranging from $10^0$ to $10^{-2}$ s$^{-1}$.

9 Claims, 1 Drawing Sheet

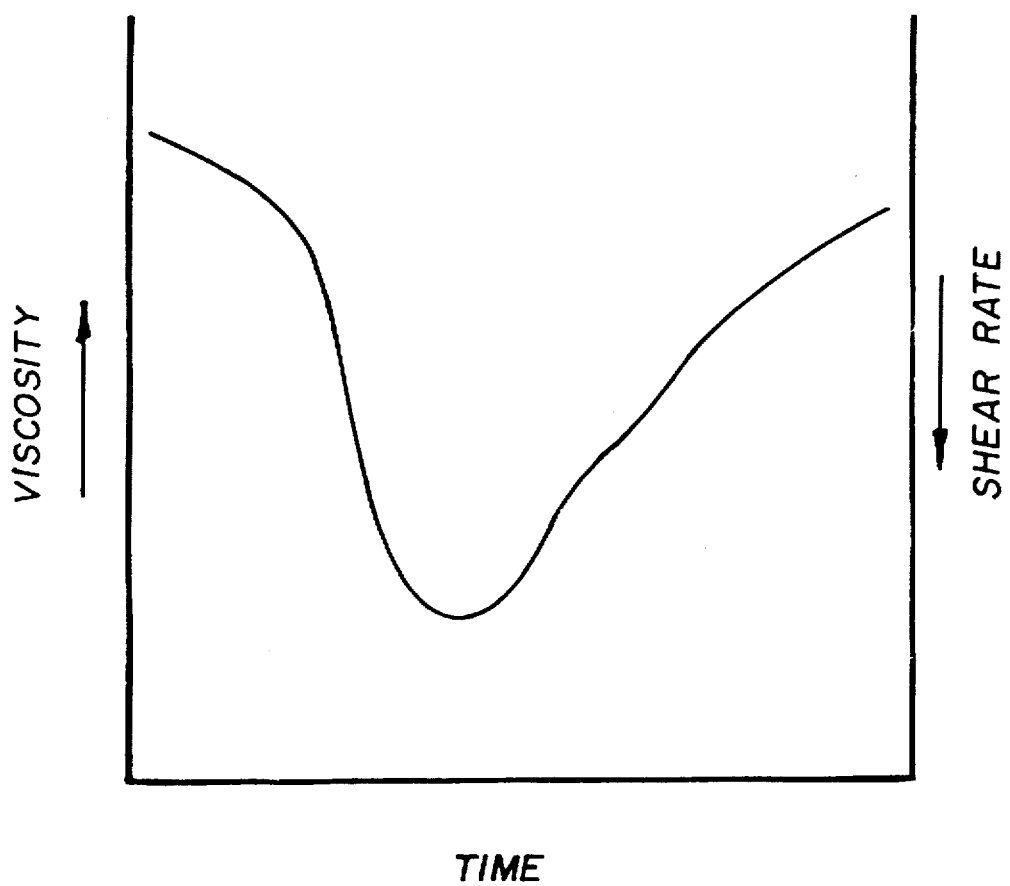

SCREEN-PRINTABLE INK-RECEPTIVE COMPOSITIONS

FIELD OF THE INVENTION

This invention relates to screen-printable ink-receptive coating compositions for use on substrates such as optical recording elements, particularly writable Photo CD elements.

BACKGROUND

Compact discs (CDs) are optical recording elements capable of storing large amounts of digital information. CDs are commonly used for storing audio information, video information, still images, documents, computer programs, and the like.

Consumer and commercial users alike have found writable CDs to be an outstanding medium for archival keeping of large volumes of data. It is critical that the CDs are protected against accidental data loss due to physical marring or tampering with the surface. Eastman Kodak Company has provided users with a writable CD. This CD has a durable ultraviolet-cured crosslinked polyacrylate coating on the top (or back) surface opposite the optical readable surface. A user can write on this surface with a felt-tipped pen or even apply a pressure sensitive adhesive label to mark the CD with identifying bar codes or labels. Attempts to remove such a label or add another over it could cause an imbalance in the spinning of the CD during playback or recording. In the worse case such attempts could remove the information recording layer and data from the CD.

There are numerous methods currently employed to label the back sides of CDs. When large numbers of CDs containing substantially the same digital information are mass-produced, labeling methods such as transfer lithography or silk-screening are commonly employed. However, when only one or even a few CDs are produced which contain unique information, these methods are economically unattractive.

Recently, a method of labeling CDs was disclosed which employs a drop-on-demand (DOD) ink jet mechanism to custom label CDs (*The Hardcopy Observer*, p 22, January, 1994). This method allows relatively rapid custom labeling of CDs using a black ink jet printing mechanism coupled to a computer. The label is composed using appropriate software on the computer and is then printed directly onto the surface of the CD.

Although this method of labeling allows for more economical custom labeling of CDs than traditional methods, such as transfer lithography, it requires that the surface of the back side of the CD be ink-receptive. It is also desirable for the back side of the CD to be coated with protective, durable layers, such as those described in U.S. Pat. No. 5,312,663. A preferred way of applying such durable overcoats to the back side of CDs is by screen-printing ultraviolet (UV) curable inks or lacquers. Unfortunately, the types of compositions which are useful as protective layers have been found to be unreceptive to common water-based ink jet inks, such as those used in the commercially available printer described above.

In European Patent Application 0 574 860 A2 ink-receptive layers are described which can be coated on the back side of CDs. However, the preferred ink-receptive layers of EP 0 564 860 A2 are not readily amenable to screen-printing methods because they do not possess the necessary rheological properties. They also do not provide the level of durability of the UV-curable compositions described in U.S. Pat. No. 5,312,663.

Inventors have found that ink-receptive compositions known in the prior art for use in ink jet recording processes generally possess rheological properties which are incompatible with the screen-printing process. For example, ink-receptive formulations such as those described in U.S. Pat. No. 5,147,717 have a tendency to leak through the screen and/or flow over the outside edges of the screen frame. Such formulations are also prone to foaming during the printing process. Also, upon removal of the screen from a CD during printing, the coated formulation tends to pulled along with the screen, forming strings or filaments of the coated formulation.

EXPLANATION OF FIGURE

The single FIGURE describes the relationship of viscosity and shear rate in the compositions of the invention.

SUMMARY OF THE INVENTION

We have found that by proper adjustment of the rheological properties the above problems are substantially solved. Accordingly the present invention provides a screen-printable ink receptive composition containing (a) a hydrophilic polymer and (b) a thickener and has (c) a viscosity of 10 to 1,000 poise at shear rates less than $10^0$ s$^{-1}$ and exhibits (d) a shear thinning behavior defined by the following relationship:

$$\log \text{(viscosity)} = A\,[\log \text{(shear rate)}]$$

wherein A represents (e) the slope of the line obtained by plotting log(viscosity) against log(shear rate) and has (f) a value of up to −0.1 when calculated over shear rates ranging from $10^0$ to $10^2$ s$^{-1}$.

This composition is unexpectedly useful for screen-printing. Those skilled in the silk screen printing arts do not expect aqueous compositions to be screen-printable. Furthermore, these compositions are screen-printable over the durable, protective overcoats referred to above thereby retaining many of the desirable protective properties of such overcoats while providing at the same time an ink-receptive surface without having to invest in additional, costly coating or printing equipment.

The composition is applied to a substrate such as the surface of a CD by a method of screen-printing an ink-receptive composition on a substrate comprising the steps of:

(a) providing a screen-printable ink receptive composition as defined above;

(b) coating a fine meshed fabric screen with the composition provided in (a);

(c) placing the coated fabric screen over the substrate;

(d) filling the screen openings with the composition by passing an applicator over the surface of the fabric; and (e) forcing the composition onto the surface of the substrate as a coating by passing an applicator under pressure over the surface of the fabric.

DETAILS OF THE INVENTION

Increasing the viscosity of the above mentioned prior art ink-receptive compositions by simply increasing the overall concentration of the non-volatile components solves the problem of the fluid leaking through the screen. However, the composition then does not readily pass through the screen upon application during the coating step, resulting in an incomplete coating and/or plugging of the screen openings. This appears to be due to the fact that the prior art compositions referred to under Background tend to be Newtonian. By Newtonian, we mean a fluid which exhibits constant viscosity as a function of shear rate. In this case, it starts out at relatively high viscosity, and remains highly viscous even when the applicator is applied.

FIG. 1 displays the relationship between shear rate and viscosity as a function of the steps in the screen-printing process for a typical commercial screen-printing ink, as further described by R. E. Trease and R. L. Dietz in *Solid State Technology*, January, 1972, pp 39–43 (copy attached). The salient features of the process represented in FIG. 1 are as follows:

- a relatively high viscosity is preferred in the initial, low-shear-rate stage of the process, such that the screen-printable composition does not readily leak through the openings in the screen prior to the application of the applicator;
- a relatively low viscosity is preferred during the high-shear-rate step of passing the squeegee over the screen, such that the screen-printable composition passes freely through the openings of the screen; and
- the screen-printable composition returns to its high viscosity state shortly after the applicator is disengaged (return to the low-shear-rate regime), again such that the screen-printable composition does not leak through the screen.

Another way of characterizing a suitable screen-printable composition is that it should possess at least a minimum viscosity at low shear rates, and that it be shear-thinning or pseudoplastic, i.e., it exhibits a decreasing viscosity as the shear rate increases. This satisfies the equation $$\log (\text{viscosity}) = A[\log (\text{shear rate})]$$

wherein the coefficient A is less than or equal to $-0.1$ when calculated for shear rates ranging from $10^0$ to $10^2$ s$^{-1}$.

We have unexpectedly found that the addition of thickeners of a certain type to the above prior art ink-receptive compositions results in compositions which are shear-thinning. Through further experimentation, we have found that by adding a preferred amount of a preferred thickener so as to impart the desired degree of shear-thinning behavior and by adjusting the coating composition to overall higher solids concentration to yield the desired viscosity at low shear rates, usable screen-printable ink-receptive compositions can be prepared.

To achieve the desired rheological requirements as defined above, the concentration of solids in the screen-printable coating composition should range between 10 and 60 wt %, preferably between 30 and 40 wt %. This of course will vary somewhat depending upon the exact composition.

Useful screen-printable ink-receptive compositions can be formulated from hydrophilic polymer compositions comprising:

(i) a poly(vinyl pyrrolidone);

(ii) particles of a polyester ionomer, such as poly(cyclohexylenedimethylene-co-xylylene terephthalate-co-malonate-co-sodioiminobis(sulfonylbenzoate)); and (iii) a polyvinyl alcohol.

Preferred formulations are free of silicone-based oils or similar additives which are not crosslinked and which tend to reside at the surface of the coating. It has been found that such materials have a deleterious effect on the ink-receptivity of the subsequently coated screen-printable ink-receptive compositions.

The thickener is important in providing the combination of high viscosity at low shear rates and relatively low viscosity at high shear rates. There are many commercially available thickeners which may be useful for this purpose, for example polysaccharides, such as carrageenan, pectin, xanthan, starch amylose, gum arabic, guar gum, carboxymethylcellulose and other cellulose derivatives, and the like; ethylene oxide polymers; and vinyl ether polymers and copolymers, such as poly(methyl vinyl ether-co-maleic anhydride), poly(isobutyl vinyl ether-co-vinyl chloride), and butyl monoesters and other alkyl monoesters. Cellulose derivatives such as hydroxypropyl cellulose, hydroxypropylmethyl cellulose, hydroxyethyl cellulose, hydroxyethylmethyl cellulose, and carboxymethyl cellulose are also useful. Hydroxyethyl cellulose derivatives include those sold under the tradenames Natrosol by Aqualon, Inc. Natrosol 250 HBR is a high molecular weight hydroxyethyl cellulose. The concentration of thickener will depend on the particular components in the screen-printable composition. Generally 0.1 to about 3 wt % will be sufficient although concentrations outside of this range may be useful depending on the other components. When Natrosol 250 HBR is used, its concentration should fall between 0.5 and 3 wt %, preferably between 1.5 and 2.5 wt %. One skilled in the art of factorial experiments would be able to determine the appropriate thickener, and concentration thereof, for a particular hydrophilic polymer composition to achieve the required rheological properties.

To overcome "stringiness", we found that a lower molecular weight version of poly(vinyl pyrrolidone) may be used, with no adverse consequences. The preferred weight average molecular weight of the poly(vinylpyrrolidone should be less than about 500,000, preferably in the range of 10,000 to 100,000. Poly(vinylpyrrolidone having a molecular weight of about 33,000 (PVP K-30 is used in the examples.

It is desirable to overcome formation of air bubbles in the coating during the screen-printing process. There are many commercially available defoamers which are designed to reduce or eliminate the problem of air entrainment. Examples of known antifoaming agents include acetylenic glycols, silicone fluids and emulsions, ethoxylated or propoxylated silicones, hydrocarbons, and fatty acid ester derivatives, acetylated polyamides, and poly(alkylene oxide) polymers and copolymers. In the following examples we used a silicone-free material sold under the tradename Surfynol D-75 by Air Products and Chemicals, Inc. A useful concentration range for the defoamer is from 0.01 to 1.0 wt %. Another useful concentration range is from 0.05 to 0.15 wt %.

Other useful additives may be added to improve surface characteristics such as texture and gloss. For example, surfactants may be used to control coating quality and inert particles may be used to control gloss. In practice, the gloss level of the surface of the coated CD is controlled by a combination of the screen mesh and the addition of inert particles. Useful inert particles include poly(methyl methacrylate-co-divinylbenzene) beads with an average particle diameter ranging from 3 to about 30 µm and at a concentration ranging from 0.5 to 5 wt % of the dried coating. Beads with an average diameter of 10 to 20 µm and at a concentration ranging from 0.5 to 2 wt % were used in the examples.

The screen-printable ink-receptive composition of the invention is screen-printed onto the CD over a silicone-free durable overcoat using either a manual process in which a screen is mounted in a wooden frame and an applicator, such as a squeegee is moved by hand or on an Autoroll Rotoflex 560 Compact Disc Printer equipped with multiple screen printing stations and a moving turntable that has nest pads capable of holding 35 CDs. The squeegee is moved at 32 in/s (81 cm/s) and the pressure is adjustable. Screen mesh size ranges from 110 to 470 threads per inch (43 to 185 threads per cm) are useful.

In both screen-printing techniques, using multiple passes, it is desirable to employ infrared lamps to dry the coating on the CD prior to additional applications.

The thickness of the screen printed ink-receptive layer is between 2 and 20 µm, preferably between 5 and 15 µm. The thickness is controlled by a combination of the rheology of the coating composition and the mesh size of the screen used in the screen-printing process. Screen mesh size ranges from 110 to 470 threads per inch (43 to 185 threads per cm) are useful.

The thickness of the ink receiving layer is critical to the quality of the ink jet print. In order to get a sufficiently thick layer on the CD surface it may be necessary to subject the CD to multiple passes in the screen printing process. Each pass should be followed by several seconds under an infrared heat lamp. This serves to drive off the moisture in the formulation and help smooth out any surfaces texture remaining from the screen.

The following examples illustrate the utility of the invention as screen-printable ink receptive compositions.

EXAMPLE 1

An ink-receptive composition comprising 22 wt % poly [1,4-cyclohexylenedimethylene-co-2,2'-oxydiethylene (46/54) isophthalate-co-5-sodiosulfo-1,3-benzenedicarboxylate (82/18)] (obtained from Eastman Chemicals as AQ-55), 10.6 wt % poly(vinyl pyrrolidone) (PVP K-30 from International Specialty Products), 0.2 wt % poly(vinylalcohol) (Airvol 350 from Air Products, Inc.) 1.5 wt % poly(methyl methacrylate-co-divinylbenzene) particles (average particle size: 15 µm, prepared by the Polymer Development Group at Eastman Kodak Co.), 0.1 wt % DF-75 (defoamer, from Air Products, Inc.), 2.0 wt % Natrosol 250 HBR (thickener, from Aqualon, Inc.), and 64 wt % distilled water was screen-printed over a recordable 120-mm diameter CD comprising a polycarbonate substrate, a recordable dye layer, an evaporated gold layer, a spin-coated first protective "lacquer layer", and a second protective durable overcoat layer (according to U.S. Pat. No. 5, 312,663) comprising an ultraviolet curable composition known as RB343 SPL 3700 (provided by Naz-DAr/KC, Inc.) which was screen-printed using a 390 mesh screen and cured to a final thickness of approximately 7 µm. The in-receptive coating was dried by brief exposure to infrared heat lamps, yielding a high quality 10 µm thick layer.

The writable CD as just described, bearing the screen printed ink-receptive coatings was labeled using a Trace CDP-5300 compact CD printer, and was found to exhibit good image quality, dry time, and durability.

EXAMPLE 2

An ink-receptive composition comprising 14.1 wt % poly[1,4-cyclohexylenedimethylene-co-2,2'-oxydiethylene (46/54) isophthalate-co-5-sodiosulfo-1,3-benzenedicarboxylate (82/18)] (obtained from Eastman Chemicals as AQ-55), 6.0 wt % poly(vinyl pyrrolidone) (PVP K-30 from International Specialty Products), 0.2 wt % poly(vinyl alcohol) (Airvol 350 from Air Products, Inc.), 1.5 wt % poly(methyl methacrylate-co-divinylbenzene) particles (average particle size: 15 µm, prepared by the Polymer Development Group at Eastman Kodak Co.), 0.1 wt % DF-75 (defoamer, from Air Products, Inc.), 3.0 wt % Natrosol 99-250 H (thickener, from Aqualon, Inc.), and 75 wt % distilled water was screen-printed over a writable 120-mm diameter CD in the same manner as previously described in Example 1.

The writable CD as just described was labeled using a Trace CDP-5300 compact CD printer, and was found to exhibit good image quality, dry time, and durability.

COMPARATIVE EXAMPLE 3

A prior-art ink-receptive composition comprising 16.0 wt % poly[1,4-cyclohexylenedimethylene-co-2,2'-oxydiethylene (46/54) isophthalate-co-5-sodiosulfo-1,3-benzenedicarboxylate (82/18)] (obtained from Eastman Chemicals as AQ-55), 7.9 wt % poly(vinyl pyrrolidone) (PVP K-30 from international Specialty Products), 0.2 wt % poly(vinyl alcohol) (Airvol 350 from Air Products, Inc.), 1.5 wt % poly(methyl methacrylate-co-divinylbenzene) particles (average particle diameter: 15 µm, prepared by the Polymer Development Group at Eastman Kodak Co.), 0.1 wt % DF-75 (defoamer, from Air Products, Inc.), and 74.3 wt % distilled water was screen-printed over a writable 120-mm diameter CD as described in Example 1. It was found that the coating composition was too thin, i.e., the viscosity was too low, and it leaked through the screen. A usable coating was not obtained.

EXAMPLE 4

An ink-receptive composition comprising 5.64 wt % poly[1,4-cyclohexylenedimethylene-co-2,2'-oxydiethylene (46/54) isophthalate-co-5-sodiosulfo-1,3-benzenedicarboxylate (82/18)] (obtained from Eastman Chemicals as AQ-55), 2.4 wt % poly(vinyl pyrrolidone) (PVP K-30 from International Specialty Products), 0.08 wt % poly(vinyl alcohol) (Airvol 350 from Air Products, Inc.), 0.6 wt % poly(methyl methacrylate-co-divinylbenzene) particles (average particle diameter: 15 µm, prepared by the Polymer Development Group at Eastman Kodak Co.), 0.04 wt % DF-75 (defoamer, from Air Products, Inc.), 1.2 wt % Natrosol 99-250 H (thickener, from Aqualon Inc.), and 90 wt % distilled water was screen-printed over a writable 120-mm diameter CD as described in Example 1. It was found that the coating composition was screen-printable.

EXAMPLE 5

Viscosity as a function of shear rate for the coating compositions described in Examples 1, 2, and 4 and comparative example 3 was measured using a Rheometrics Fluids Spectrometer with a cone and plane geometry. The instrument was set up with a plate diameter of 50 mm and a cone angle of 0.02 radian. The shear rate was varied from $10^{-1}$ to $10^{2.7}$ s$^{-1}$. Table 1 summarizes the pertinent data.

TABLE 1

| | Comparison of the rheological properties | | | |
|---|---|---|---|---|
| Example | η (poise) @ shear rate of 10⁰ s⁻¹ | A | Prior Art | Screen-Printable |
| 1 | 160 | −0.27 | No | Yes |
| 2 | 110 | −0.17 | No | Yes |
| 3 | 0.36 | −0.01 | Yes | No |
| 4 | 48 | −0.51 | No | Yes |

This example shows that the ink-receptive compositions of the present invention which contain thickeners and which meet the requirements of viscosity (η)≧10 poise at 10⁰ s⁻¹ and A≧−0.1 are screen-printable, but the prior art compositions which do not contain thickeners and do not meet the rheological requirements are not screen-printable.

The invention has been described in detail with particular reference to preferred embodiments thereof, but it will be understood that variations and modifications can be effected within the spirit and scope of the invention.

We claim:

1. A screen-printable ink-receptive composition containing a hydrophilic polymer composition and a thickener; wherein the composition:

(a) has a viscosity of 10 to 1,000 poise at shear rates less than 10⁰ s⁻¹;

(b) exhibits a shear thinning behavior defined by the following relationship:

$$\log(\text{viscosity}) = A\,[\log(\text{shear rate})]$$

in which A represents the slope of the line obtained by plotting log(viscosity) against log(shear rate) and A has a value of up to −0.1 when calculated over shear rates ranging from 10⁰ to 10² s⁻¹; and (c) the hydrophilic composition contains:
  (i) a poly(vinyl pyrrolidone);
  (ii) particles of poly(cyclohexylenedimethylene-co-xylylene terephthalate-co-malonate-co-sodioiminobis(sulfonylbenzoate)polyester ionomer; and
  (iii) a polyvinyl alcohol.

2. A screen-printable ink-receptive composition containing a hydrophilic polymer composition and a thickener; wherein the composition:

(a) has a viscosity of 10 to 1,000 poise at shear rates less than 10⁰ s⁻¹;

b) exhibits a shear thinning behavior defined by the following relationship:

$$\log(\text{viscosity}) = A\,[\log(\text{shear rate})]$$

in which A represents ale slope of the line obtained by plotting log(viscosity) against log(shear rate) and A has a value of up to −0.1 when calculated over shear rates ranging from 10⁰ to 10² s⁻¹; and (c) the hydrophilic composition contains:
  (i) a poly(vinyl pyrrolidone) having a molecular weight of about 33,000;
  (ii) poly[1,4-cyclohexylenedimethylene-co-2,2'-oxydiethylene (46/54) isophthalate-co-5-sodiosulfo-1,3-benzenedicarboxylate (82/18)] polyester ionomer; and
  (iii) a polyvinyl alcohol and
  (iv) hydroxyethyl cellulose and
  (v) water.

3. The composition of claim 1 or 2 comprising from 0.1 to 3.0 weight percent thickener and a defoamer.

4. The composition of claim 3 comprising 0.5 to 3.0 weight percent hydroxyethyl cellulose as the thickener and a defoamer.

5. The composition of claim 4 comprising 1.5 to 2.5 weight percent hydroxyethyl cellulose and a defoamer.

6. The composition of claim 5 wherein the defoamer concentration is 0.01 to 0.15 weight percent.

7. The composition of claim 6 wherein the defoamer is silicone-free.

8. The composition of claim 1 or 2 wherein the poly(vinyl pyrrolidone) has a molecular weight of 10,000 to 500,000.

9. The composition of claim 1 or 2 wherein the poly(vinyl pyrrolidone) has a molecular weight of 10,000 to 100,000.

* * * * *